United States Patent [19]

Rall

[11] 4,063,786
[45] Dec. 20, 1977

[54] SELF-LUBRICATING AUXILIARY BEARING WITH A MAIN BEARING FAILURE INDICATOR

[75] Inventor: Marcus E. Rall, Cridersville, Ohio

[73] Assignee: Westinghouse Electric Corporation, Pittsburgh, Pa.

[21] Appl. No.: 748,795

[22] Filed: Dec. 9, 1976

[51] Int. Cl.² ........................................... F16C 17/20
[52] U.S. Cl. ..................................... 308/1 A; 308/35;
308/238; 308/DIG. 8; 308/DIG. 9; 340/269
[58] Field of Search .......... 308/1 A, 1 R, 35, DIG. 9,
308/DIG. 8, 237 R, 237 A, 238, 240, 187, 188,
202; 340/269, 282; 200/61.4; 73/7

[56] References Cited

U.S. PATENT DOCUMENTS

| 3,183,043 | 5/1965 | Creeger et al. | 308/35 X |
| 3,508,241 | 4/1970 | Potter | 340/269 |
| 3,880,479 | 4/1975 | DeFeo et al. | 308/35 X |

*Primary Examiner*—Trygve M. Blix
*Assistant Examiner*—Douglas C. Butler
*Attorney, Agent, or Firm*—J. W. Keen

[57] ABSTRACT

An auxiliary bearing structure having a selflubricating sleeve which is, upon main bearing failure, engaged by a shaft mounted runner which also actuates a main bearing failure indicator. A portion of the runner also provides a debris shield between the main bearing and auxiliary bearing. Main bearing failure annunciation is accomplished by the runner abrading insulation from an insulated electrical probe during main bearing failure.

6 Claims, 1 Drawing Figure

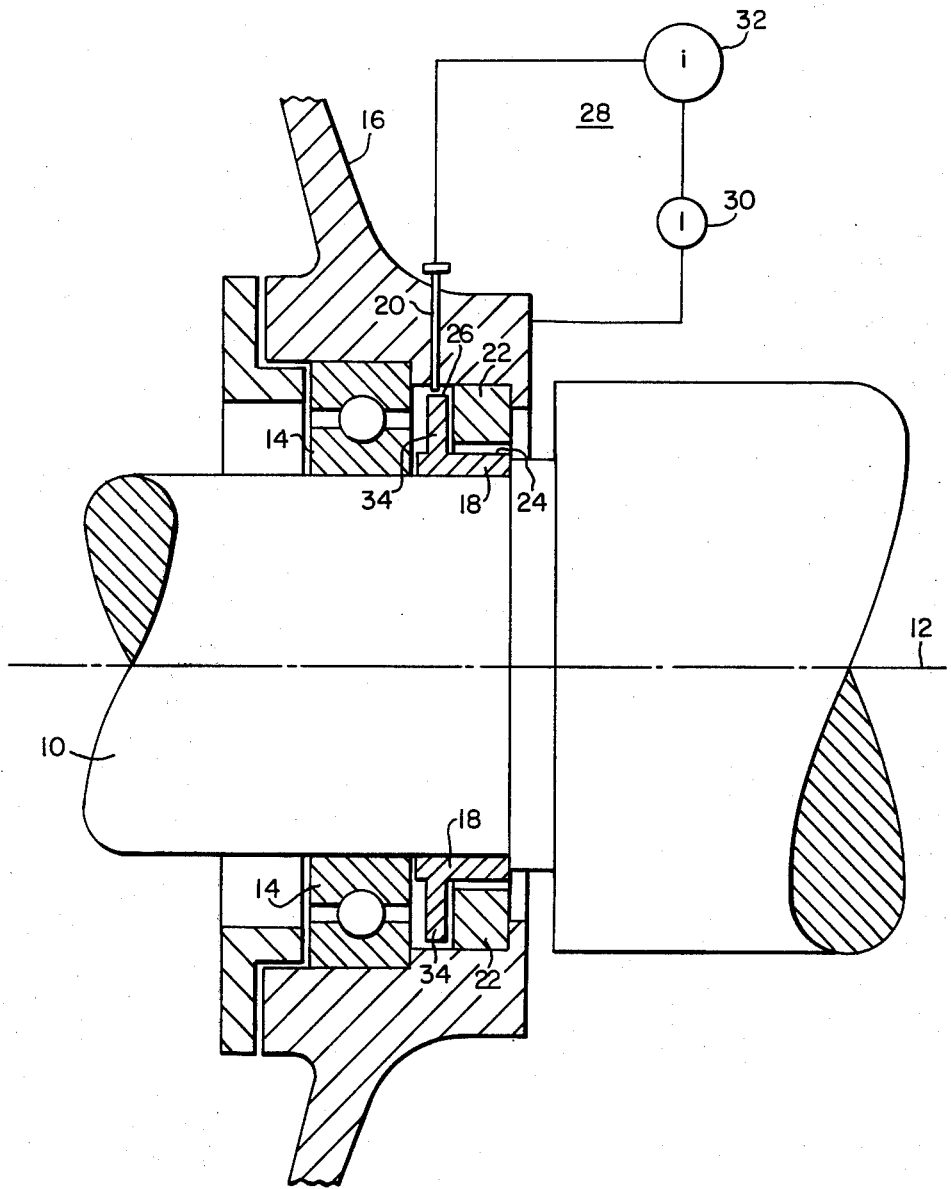

SELF-LUBRICATING AUXILIARY BEARING WITH A MAIN BEARING FAILURE INDICATOR

BACKGROUND OF THE INVENTION

This invention relates to auxiliary bearings and more particularly to an auxiliary bearing which cooperates with a main bearing failure indicator.

Shafts in many machines should have the capability of rotating for a period of time after their main supportive bearings have failed. The duration of the previously mentioned period of time depends on the machine's application. For example, when an aircraft is in flight and its generator's main bearings fail, it is desirable that the generator maintain power output for the flight's duration without sustaining further damage. It is also desirable to provide an early failure indication for the main supportive bearings before they have failed completely to allow the machine operator or pilot additional time to evaluate the circumstances and determine a course of action as to whether shutdown of the apparatus or continued operation is called for. Early failure indication for the main bearings permits a scheduled main bearing replacement thus avoiding irreparable damage to the machine while avoiding unnecessary maintenance and exhaustive inspection procedures as is now common for aviation applications. One way to provide simple and reliable bearing failure indication is to allow a shaft mounted runner to abrade insulation from an electrical probe which is inserted through the bearing's housing. The rotating runner normally does not engage the insulated electrical probe but, upon initiation of main bearing failure, radial movement of the shaft and shaft mounted runner is increased until the runner contacts the inserted electrical probe and grounds it to the bearing housing. By grounding the electrically charged probe, a circuit is completed and an electrical alarm indicator is signaled. However, this necessitates a runner which will wear away the insulation quickly and yet provide a long-lasting auxiliary bearing.

Secondly, auxiliary bearings often fail when exposed to debris emanating from the main bearing after its failure. The optimum solution to such a problem is to physically remove the auxiliary bearing from the vicinity of the main bearing but, this may be impossible in lightweight, compact applications such as aircraft generators. An alternative to physical removal is shielding the auxiliary bearing from the main bearing.

If the auxiliary bearing is shielded from main bearing debris, the auxiliary bearing may also be shielded from lubricating fluid supplied to the main bearing. Also, in oil-cooled bearing designs, most main bearing failures are due to lack of lubricating fluids supplied thereto. Since lubrication systems are frequently used as the oil source for both main bearings and auxiliary bearings, any failure of those lubrication systems would adversely affect the auxiliary bearings as well as the main bearings.

Many bearing wear indicators have been developed such as U.S. Pat. No. 3,108,264; U.S. Pat. No. 3,102,759; and U.S. Pat. No. 3,897,116. The aforementioned patents, however, provide no auxiliary bearings and have wear indicators of greater complexity and lower reliability than the present invention. U.S. Pat. Nos. 3,183,043 and 3,508,241 by Creeger et al and Potter, respectively, illustrate bearing wear indicators used in combination with auxiliary type bearings. The auxiliary bearings in those patents are drastically different from those of the present invention and have less favorable wear and journaling characteristics than this invention. The auxiliary bearings which are the subject of Potter's patent have no positive lubrication means illustrated or described for them. In fact, Potter's patent indicates the rotating machine should be disconnected from its driving source upon failure of the main bearings so as to allow the machine to come to rest while being supported by the auxiliary bearings. A disadvantage of Potter's auxiliary ball bearings is that the ball bearings experience fretting corrosion during normal operation when the auxiliary ball bearings are not engaged. Since there are no known simple inspection procedures for auxiliary ball bearings they are often unnecessarily replaced during overhaul of mechanisms such as aircraft generators.

Creeger's auxiliary bearing is simply a guiding surface on the main bearing housing structure which will journal a shaft when the main bearing fails. The guiding surface for the auxiliary bearing, even with lubrication supplied thereto, will experience a temperature increase upon main bearing failure which can cause the auxiliary bearing to exhibit unfavorable wear characteristics resulting in improper shaft support after a relatively short time.

SUMMARY OF THE INVENTION

In general, an on-condition bearing structure having a sleeve of self-lubricating material supported by a stationary bearing housing which surrounds a rotatable shaft. A main bearing which normally supports the shaft and prevents engagement between the sleeve and a shaft mounted runner permits such engagement when that main bearing fails. Such engagement, however, is preceded by a failure indication which is actuated by the shaft mounted runner being radially displaced as the main bearing fails and abrades insulation from an electrical probe which protrudes through the stationary bearing housing causing the electrical probe to become grounded with the bearing housing which completes an electrical alarm circuit.

The runner serves the dual purpose of shielding the auxiliary, self-lubricating bearing structure from debris expelled by the main bearing while, at the same time, actuating the failure indicator. By providing failure indication for the main bearings before they become nonoperational, relatively inexpensive main bearing replacement can be scheduled while avoiding irreparable damage to the shaft and surrounding machine parts.

BRIEF DESCRIPTION OF THE DRAWING

The objects and advantages of this invention will become more apparent from reading the following detailed description in connection with the accompanying drawing, in which:

Sole FIGURE is a sectioned view of a shaft supported by main bearings and a self-lubricating auxiliary bearing which journals the shaft upon main bearing failure allowing the completion of a bearing failure indicator circuit.

DESCRIPTION OF THE PREFERRED EMBODIMENT

Referring now to the drawing in detail, sole FIGURE shows a portion of shaft 10 rotatable about axis 12 and normally supported by bearing 14 which is here indicated as being a ball bearing. Bearing 14 is assembled between shaft 10 and electrically conductive stationary bearing housing member 16. Runner 18 mounted on shaft 10 and being axially adjacent to bearing 14 is normally unengaged with insulated electrical probe 20 and self-lubricating sleeve 22 which is polytetrafluoroethylene impregnated graphite, by example. Upon failure of bearing 14, the radial separation distance between surface 24 on runner 18 and sleeve 22 decreases from a normal value of 0.010–0.012 of an inch while radial clearance between surface 26 of runner 18 and insulated probe 20 also decreases from a normal value of 0.007–0.008 of an inch but, since the radial clearance therebetween is less than the radial separation distance between surface 24 and sleeve 22, surface 26 begins abrading insulation from probe 20 before surface 24 and sleeve 22 become engaged. The insulation abrasion eventually shorts out probe 20 and causes an alarm circuit to be completed before bearing 14 has failed completely. To allow surface 24 and sleeve 22 to journal shaft 10, it is necessary that surface 26 wear down radially. Bronze, for example, may be used for runner 18 material because of its physical properties.

Circuit 28 is completed when insulated electrical probe 20 has its insulation worn away and is grounded electrically to bearing housing 16 which is electrically connected in series with both an electric signal means 30 and one terminal of an electric current source 32. The other terminal of current source 32 is, of course, electrically connected to the insulated probe 20. Radial extension 34 of runner 18 provides shielding for engageable surface 24 and sleeve 22, thus preventing their abrasion from debris which has been expelled by bearing 14 at its time of failure. Extension 34 also acts as a centrifugal oil flinger and retards lubricating oil leakage from bearing 14 past self-lubricating sleeve 22.

It is to be understood that the foregoing description and accompanying drawing have been given only by way of illustration and example and that various modifications will occur to those skilled in the art without departing from the spirit of this invention. Examples of such modifications are: any bearing may be substituted for ball bearing 14, runner 18 may be composed of material other than bronze as specifically described and the self-lubricating sleeve 22 may be composed of material having physical properties similar to polytetrafluoroethylene impregnated graphite.

I claim as my invention:

1. An apparatus having an on-condition bearing structure therein, said apparatus comprising:
    a rotatable shaft;
    a stationary bearing housing through which said shaft extends, said stationary bearing housing having a bearing surface and a mounting surface axially displaced from each other along said shaft;
    a bearing member disposed between said shaft and said bearing surface;
    a means for indicating failure of said bearing member;
    a sleeve of self-lubricating material disposed about said shaft, said sleeve being of suitable length and having a radially inner surface surrounding said shaft and having a radially outer surface in register with said bearing housing's mounting surface; and
    a runner mounted on said shaft to rotate therewith, having a first radial extension portion disposed between said shaft and said sleeve's inner surface and having a second radial extension portion, said first radial extension portion and said inner surface being normally separated by a predetermined distance and said second radial extension portion normally being separated from said indicating means by a predetermined clearance which is less than said predetermined distance wherein upon failure of said bearing member said runner member's second radial extension portion contacts and actuates said indicating means and said runner member's first radial extension portion engages said sleeve's inner surface causing said shaft to be journaled thereby.

2. The apparatus of claim 1, said indicating means comprising:
    an insulated electrical probe having one end electrically connected to a terminal of a source of electric current and having a second end extending radially inward from said stationary bearing housing in general axial alignment with said runner member's second portion and being normally unengaged with said second portion; and,
    means for electrically connecting said stationary bearing housing in series with an electric signal means and with the other terminal of the electric current source wherein upon failure of said bearing member, said second portion engages said probe, abrading said probe's insulation, electrically grounding said probe to said bearing housing, and causing said signal means to provide a bearing failure indication.

3. The apparatus of claim 1, said self-lubricating material comprising: polytetrafluoroethylene impregnated graphite.

4. The apparatus of claim 1, said runner member's second portion comprising: a readily abradable material.

5. The apparatus of claim 4, said readily abradable material comprising: bronze.

6. The apparatus of claim 1, wherein said runner member's second portion provides a seal which prevents escape of lubricants supplied to said bearing member and shields said first portion and said sleeve from debris expelled by said bearing member during its failure.

* * * * *